United States Patent [19]

Alexandrovich

[11] 4,113,266
[45] Sep. 12, 1978

[54] PLAYBACK STYLUS FOR PHONOGRAPH RECORD STAMPER

[75] Inventor: George Alexandrovich, Commack, N.Y.

[73] Assignee: Pickering & Company, Inc., Plainview, N.Y.

[21] Appl. No.: 790,391

[22] Filed: Apr. 25, 1977

[51] Int. Cl.² .......................... G11B 3/02; G11B 3/44
[52] U.S. Cl. ........................................ 274/37; 274/38
[58] Field of Search .................................. 274/37, 38

[56] References Cited

U.S. PATENT DOCUMENTS

| 2,195,758 | 4/1940 | Rysick | 274/38 |
| 3,143,199 | 8/1964 | Gerber | 274/10 |
| 3,292,936 | 12/1966 | Grado | 274/38 |
| 3,497,636 | 2/1970 | Bayless | 274/38 |

FOREIGN PATENT DOCUMENTS

| 431,077 | 10/1911 | France | 274/38 |
| 967,169 | 10/1950 | France | 274/38 |
| 885,163 | 6/1953 | Fed. Rep. of Germany | 274/38 |
| 359,899 | 3/1962 | Switzerland | 274/38 |

*Primary Examiner*—Charles E. Phillips
*Assistant Examiner*—John W. Shepperd
*Attorney, Agent, or Firm*—Kane, Dalsimer, Kane, Sullivan and Kurucz

[57] ABSTRACT

A playback stylus for a phonograph record stamper and matrix is provided. The stylus comprises a pair of substantially cylindrical jeweled members each terminating at a tipped end. The members each have a flat surface defining a plane parallel to its longitudinal axis. The members are bonded to each other along the flat surfaces with the tip ends aligned to form a "V." The ends of the members opposite the tip ends are bonded to a tube.

4 Claims, 5 Drawing Figures

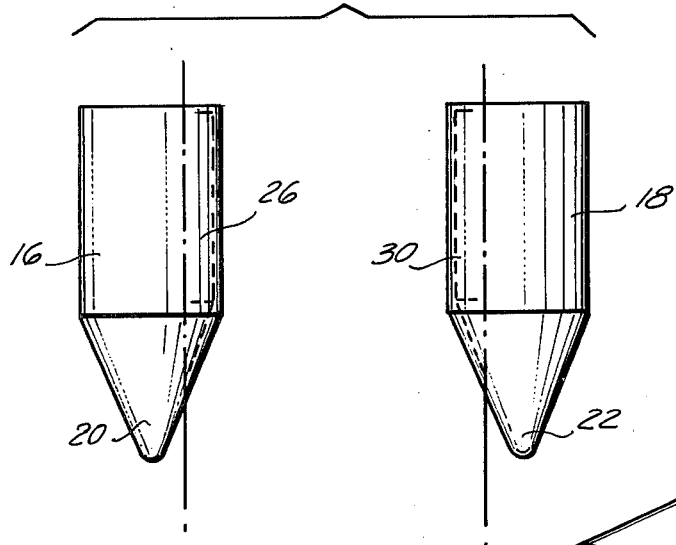
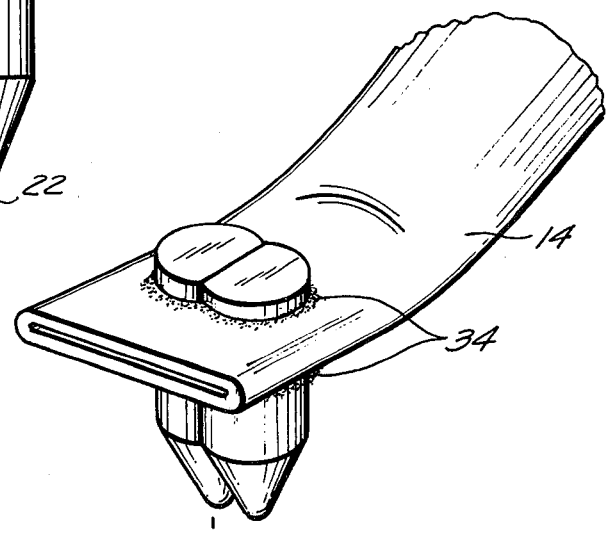
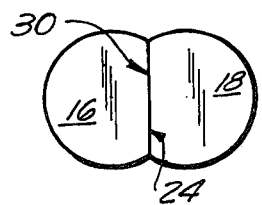
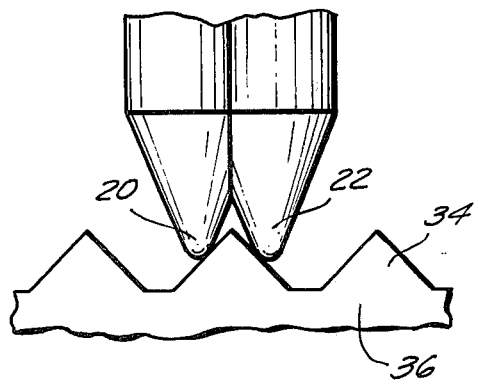
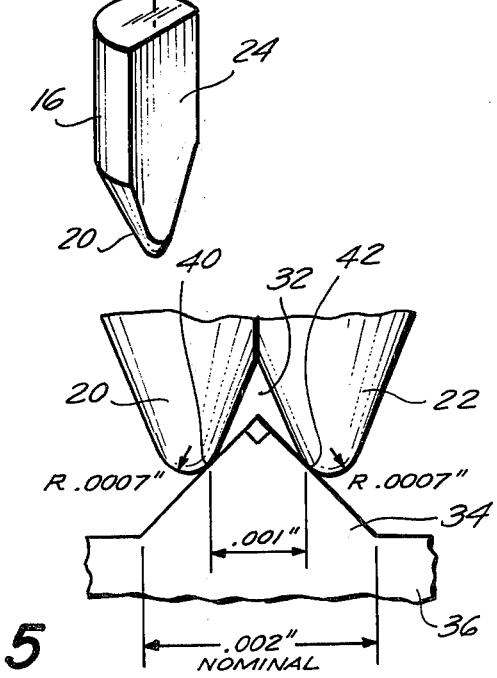

PLAYBACK STYLUS FOR PHONOGRAPH RECORD STAMPER

BACKGROUND OF THE INVENTION

The present invention relates to phonograph cartridge styli and more particularly to a stylus for playing back the matrix or stamper with which phonograph records are stamped.

The first step in the production of phonograph records comprises the cutting of a master. The master is then used to produce a metal matrix which is the negative of the master and used to produce a metal mother. From the metal mother, stampers are formed which are duplicates of the matrix. The matrix and stampers are the negative or reverse of the master to the extent that grooves in the master become raised ridges in the stamper and vice-versa. The stamper is formed of a relatively hard metal and it in turn is then used with another stamper representing the other side of the record as a die into which vinyl material is introduced and squeezed under extremely high pressure to form the final phonograph record platter.

It can thus be seen that the resultant final record disc can only be as good as the stamper. Heretofore, means have been available to play back the master, mother and final record but not the stamper or matrix. It was necessary to produce records from a stamper and then play back the records in order to test the accuracy of the stamper, requiring as a result the expenditure of time and labor. If the produced record did not play back true, it was then necessary to determine whether the problem was in the stamper or record. Further, if the problem was in the stamper, as for example, a high spot or rough spot, it was difficult to pinpoint the location of the problem area for correction.

In view of the above, it is the principal object of the present invention to provide an improved phonograph cartridge stylus specifically adapted to permit the playback of phonograph record stampers.

A further object is to provide such a stylus which may be utilized in a conventional phonograph cartridge.

A still further object is to provide such a stylus which, while playing the master can also serve to remove or polish down high or rough spots.

SUMMARY OF THE INVENTION

The above and other beneficial objects and advantages are attained in accordance with the present invention by providing a stylus comprising a pair of elongated jeweled members each terminating at a tipped end. The members each have a flat surface defining a plane parallel to its longitudinal axis. The members are bonded to each other along the flat surfaces with the tip ends aligned to form a "V." The ends of the members opposite the tip ends are bonded to a tube.

BRIEF DESCRIPTION OF THE DRAWINGS

In the accompanying drawings:

FIG. 1 is a greatly enlarged perspective view of a stylus in accordance with the present invention;

FIG. 2 is a side elevational view showing the jeweled members from which the stylus is formed separated;

FIG. 3 is a bottom plan view of the stylus;

FIG. 4 is a diagrammatic side elevational view of the stylus as it rides along a ridge of a record stamper; and, FIG. 5 is an enlarged view similar to FIG. 4 showing details of the stylus and stamper.

DETAILED DESCRIPTION OF THE PREFERRED EMBODIMENT

Reference is now made to the drawings and to FIG. 1 in particular wherein a stylus assembly 10 in accordance with the present invention is shown. The assembly comprises a jewel element 12 (preferably diamond or saphire) fixed at one end to a metallic tube 14. The jewel is designed to track a record stamper and translate the undulations in the ridges of the stamper into movement of the tube. The tube, in turn, carries a magnetic member (not shown) which cooperates with a cartridge assembly (not shown) to generate electrical signals corresponding to the stamper construction.

Referring to FIG. 2, it can be seen that the jewel element 12 comprises a pair of elongated, substantially cylindrical members 16 and 18. The members 16 and 18 are identical to each other and each tapers to a rounded tip (20 and 22 respectively for members 16 and 18). The tips 20 and 22 are ground in accordance with conventional techniques to produce a phonograph stylus tip. That is, the tips 20 and 22 may be of any conventional configuration (elliptical, conical, "Shibata", etc.) having two diametrically opposed edges 40 and 42 designed to contact the walls of a record groove. A longitudinally extending flat surface 24 is ground on member 16 by removing the minor portion 26 of member 16 shown in phantom. An identical flat surface 28 is ground on member 18 by removing portion 30. The flat surface 26 defines a plane which extends parallel to the longitudinal axis of member 16 and similarly, the flat surface 28 of member 18 defines a plane which extends parallel to the axis of member 18. As noted, however, the flat surraces are offset from the longitudinal axes.

Members 16 and 18 are bonded to one another along surfaces 24 and 28 using a suitable bonding agent such as an epoxy cement. The members are aligned so that the tips 20 and 22 cooperate in defining a "V" gap which is designated generally by the numeral 32 in FIG. 5. The bonded members are then positioned through an opening in the stylus tube and secured in position with additional epoxy. The stylus assembly may then be used with a conventional cartridge to play back a phonograph record stamper on a conventional turntabel — the only difference being that the turntable must rotate in the direction opposite to that in which it would rotate for conventional record play.

Referring to FIGS. 4 and 5, it can be seen that the V gap 32 of the stylus assembly strides the ridges 34 of stamper 36. The surfaces 40 and 42 of the stamper engaged by the stylus assembly are the edges of the original members which were contoured to engage a record. That is, the stamper is engaged along edges that could properly engage the groove of a phonograph record produced from the stamper.

Since the stylus is formed of a relatively hard jewel, as it engages the stamper it will tend to have a light polishing motion thereby removing any burrs or extraneous material on the stamper. Similarly, since the stylus permits direct playback of the stamper, any inaccuracies in the stamper can be immediately detected. Thus, the aforementioned objectives are attained.

Having thus described the invention, what is claimed is:

1. A stylus assembly for tracking a phonograph record stamper or matrix comprising: a first elongated member having a longitudinally extending body portion terminating at one end in a pointed tip having diametrically opposed edges contoured to engage a phonograph record; a first flat surface extending longitudinally along substantially the entire length of said first member; a second elongated member having a longitudinally extending body portion terminating at one end in a pointed tip having diametrically opposed edges contoured to engage a phonograph record; a second flat surface extending longitudinally along substantially the entire length of said second member; means bonding said first member and said second member to each other along said flat surfaces with said members aligned so that said tips together define a "V" with an edge of one member facing an edge of the other member so that the stylus assembly can simultaneously engage both sides defining a ridge of a stamper or matrix, an elongated tube, and means for bonding the ends of said members opposite said "V" to said tube with said tips defining a line perpendicular to the direction of said elongated tube.

2. The stylus in accordance with claim 1 wherein said first and second members are identical with each other.

3. The stylus in accordance with claim 2 wherein each of said members defines a major cylindrical section and said flat surfaces are offset from the longitudinal axis of said members.

4. The stylus in accordance with claim 1 wherein said members are formed of jewels.

* * * * *